(12) United States Patent
Fernstrom (10) Patent No.: US 7,770,220 B2
(45) Date of Patent: Aug. 3, 2010

(54) SYSTEM AND METHOD FOR SECURING DOCUMENTS USING AN ATTACHED ELECTRONIC DATA STORAGE DEVICE

(76) Inventor: Christer E. Fernstrom, 23, chemin des demoiselles, Saint Ismier (FR) FR-38330

( * ) Notice: Subject to any disclaimer, the term of this patent is extended or adjusted under 35 U.S.C. 154(b) by 1029 days.

(21) Appl. No.: 11/204,961

(22) Filed: Aug. 16, 2005

(65) Prior Publication Data

US 2007/0056034 A1 Mar. 8, 2007

(51) Int. Cl.
*H04L 9/32* (2006.01)
(52) U.S. Cl. .............................. 726/20; 726/19; 726/5; 726/18
(58) Field of Classification Search ................ 380/200, 380/30; 713/192, 168, 182; 726/4, 13, 30, 726/24; 719/311; 709/12, 14; 717/124
See application file for complete search history.

(56) References Cited

U.S. PATENT DOCUMENTS

| | | | |
|---|---|---|---|
| 5,621,200 A | 4/1997 | Irwin, Jr. et al. | 235/375 |
| 5,983,065 A * | 11/1999 | Folkins et al. | 399/366 |
| 6,053,405 A | 4/2000 | Irwin, Jr. et al. | 235/375 |
| 6,585,154 B1 | 7/2003 | Ostrover et al. | 235/375 |
| 2002/0080386 A1 | 6/2002 | Snowdon et al. | 385/1.15 |
| 2002/0091800 A1 * | 7/2002 | Wilkinson et al. | 709/219 |
| 2003/0005303 A1 * | 1/2003 | Auslander et al. | 713/176 |
| 2003/0204812 A1 * | 10/2003 | Hayashi | 715/500 |
| 2005/0039034 A1 * | 2/2005 | Doyle et al. | 713/193 |
| 2005/0064502 A1 * | 3/2005 | Lapstun et al. | 435/6 |
| 2005/0081041 A1 * | 4/2005 | Hwang | 713/176 |
| 2005/0097323 A1 * | 5/2005 | Lapstun et al. | 713/168 |
| 2005/0141004 A1 * | 6/2005 | Kiwada | 358/1.12 |

\* cited by examiner

*Primary Examiner*—Ellen Tran
*Assistant Examiner*—Nega Woldemariam
(74) *Attorney, Agent, or Firm*—Philip E. Blair; Fleit Gibbons Gutman Bongini & Bianco P.L.

(57) ABSTRACT

A system and method for controlling the reproduction of secure documents includes detecting an electronic data storage device of a secure document; reading the electronic data storage device of the secure document; determining rules for accessing the information stored in the electronic data storage device of the secure document; obtaining a user identity; comparing the rules for accessing the information with the user identity; and determining which of the information stored in the electronic data storage device to allow access to.

24 Claims, 6 Drawing Sheets

SYSTEM AND METHOD FOR SECURING DOCUMENTS USING AN ATTACHED ELECTRONIC DATA STORAGE DEVICE

RELATED APPLICATIONS

None.

FIELD

The embodiments disclosed herein relate to documents containing information to which access is to be restricted, and more particularly to a system and method for controlling reproduction and dissemination of secure documents using an attached electronic data storage device that stores the information as well as the rules for accessing the information.

BACKGROUND

Individuals are often comfortable dealing with documents in hardcopy format. However, control of document reproduction and dissemination is a concern because copies of documents containing sensitive information can be easily transmitted from person to person. As such, there is a risk of documents containing sensitive information being reproduced innocently or illicitly by persons without authorization.

Various technologies have been developed to limit the unauthorized copying of sensitive information contained in a document by replacing the sensitive information with machine readable code. U.S. Pat. No. 4,728,984 discloses a bar-coded document that enables the document or document copies to be mailed or exchanged without revealing the documents content to non-authorized persons. Bar code storage density is low and once access to the document is granted, the document is revealed in its entirety. U.S. Pat. No. 5,982,956 discloses sensitive documents that include rules which define duplication restrictions. Once a request for duplication is received the rules are read and a decision is made to allow or disallow the entire contents of the document to be reproduced. U.S. Pat. No. 6,175,714, describes the use of glyphs that encode a security code for access to a reproduced document. The glyphs are placed in the background of the entire document and are visually obtrusive. Once access to the document is granted, the entire document is reproduced.

Prior attempts to control reproduction of documents containing sensitive information offer access that is all or nothing. Once access is granted, it cannot be controlled in any other way which makes it difficult to control who should have access to the information contained within the document. Thus, there is a need in the art for a system and method for securing documents using an electronic data storage device that stores the information as well as the rules for accessing the information.

SUMMARY

Systems and methods for controlling reproduction and dissemination of secure documents using an attached electronic data storage device that stores the information as well as the rules for accessing the information are disclosed herein.

According to aspects illustrated herein, there is provided a system for creating a secure document that includes an input device for creating an electronic version of a document, the document containing information to which access is to be restricted; a secure document server in operative communication with the input device, wherein the secure document server gathers the information to which access is to be restricted from the input device and prepares a data structure comprising the information and user authorization restrictions for the information; an electronic data storage device for storing the data structure; a computing loader device in operative communication with the secure document server for loading the data structure onto the electronic data storage device; and an image producing system for creating a secure document, the electronic data storage device attached to the secure document.

According to aspects illustrated herein, there is provided a system for reproducing a secure document that includes an input device for creating an electronic version of a secure document, the secure document comprising an electronic data storage device; a computing reading device for reading a data structure stored in the electronic data storage device; a user interface module for receiving a user identity; and an image producing system for reproducing the secure document.

According to aspects illustrated herein, there is provided a method for creating a secure document that includes selecting information in a document to which access is to be restricted; defining rules for accessing the information; producing a data structure; storing the data structure in an electronic data storage device; and creating a secure document.

According to aspects illustrated herein, there is provided a method for accessing information stored in an electronic data storage device of a secure document that includes detecting an electronic data storage device of a secure document; reading the electronic data storage device of the secure document; determining rules for accessing the information stored in the electronic data storage device of the secure document; obtaining a user identity; comparing the rules for accessing the information with the user identity; and determining which of the information stored in the electronic data storage device to allow access to.

According to aspects illustrated herein, there is provided a secure document that includes a hardcopy document; an electronic data storage device operatively connected to the hardcopy document, the electronic data storage device storing information to which access is to be restricted and rules for accessing the information.

BRIEF DESCRIPTION OF THE DRAWINGS

The presently disclosed embodiments will be further explained with reference to the attached drawings, wherein like structures are referred to by like numerals throughout the several views. The drawings are not necessarily to scale, the emphasis having instead been generally placed upon illustrating the principles of the presently disclosed embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

A system and method for creating and reproducing secure documents is disclosed. In the method for creating a secure document, a document is analyzed, information to which access is to be restricted are selected and rules regarding access to the information are created. The contents, access rules, and the position of the information in the document is stored in an electronic data storage device that is embedded in, or attached to, the document, thereby creating a secure document.

According to aspects illustrated herein, there is provided a system and method for controlling reproduction and dissemination of secure documents containing information to which access is to be restricted by using an attached electronic data storage device that stores the information as well as the rules for accessing the information. The electronic data storage device provides on-board capabilities to manage and control access to the information it stores, so that users or devices that attempt to retrieve the information are granted access according to the users degree of authorization. Even if a secure document is widely disseminated, the rules (user authorization restrictions) associated with the secure document would only allow those individuals with access to the information to view the information. The system and method are an unobtrusive, reliable way to secure sensitive information contained in a document such that reproduction and dissemination of the document are controlled.

"Document" as used herein refers to any printed or written item containing visually perceptible data, as well as to any data file which may be used to produce such a printed or written item. While a document is typically at least one sheet of paper, the definition of document includes, but is not limited to, pages, sheets, labels, boxes, packages, tags, boards, signs and any other item which contains or includes a "writing surface" as defined herein below. A document may be a hardcopy, an electronic document file, one or a plurality of electronic images, electronic data from a printing operation, a file attached to an electronic communication or data from other forms of electronic communication.

"Writing surface" as used herein includes, but is not limited to, paper, cardboard, acetate, plastic, fabric, metal, wood and adhesive backed materials. Writing surfaces may be applied, for example, as pre-cut sheets or rolls.

The secure documents disclosed herein include an electronic data storage device which refers to a machine-writeable and machine-readable device capable of storing electronic data. Electronic data storage device refers to a single electronic data storage device as well as to a collection of two or more electronic data storage devices connected, for example, in series, in parallel, or nested one within another. Examples of electronic data storage devices include, but are not limited to, radio frequency identification tags (RFID tags), proximity (Prox) tags, iButtons, smartcards, and similar devices. Radio frequency identification (RFID) is a method of remotely storing and retrieving data using devices called RFID tags/transponders. An RFID tag is a small object, such as an adhesive sticker, that can be attached to or incorporated into a product. RFID tags contain antennas to enable them to receive and respond to radio-frequency queries from an RFID transceiver.

The electronic data storage device may be attached to the physical document by an adhesive, by a spiral binding, by a removable adhesive, by a magnetic material, by an embedding procedure, by a glue, or some other mechanical attachment method known in the art. Attachment may be permanent or removable. "Attached" and "affixed" as used herein are defined as operatively connected to or in close proximity to. The electronic data storage device may be "embedded" to a writing surface of a document using a process such as Printed Organic Electronics (POE) using a reel-to-reel fabrication process to print the electronic data storage device on a writing surface. By attaching small, inexpensive, electronic data storage devices to paper documents that can store the required electronic information, the advantages of electronic media are merged with the convenience of paper.

The attachment of an electronic data storage device to a writing surface can be performed automatically at the same time that a secure document is printed, copied or faxed. This means that in every case that the paper document is available, electronic information associated with that document is also available. Alternatively, an electronic data storage device may be attached to an existing writing surface and then used to create a secure document using the system and methods disclosed herein.

Figure 1:
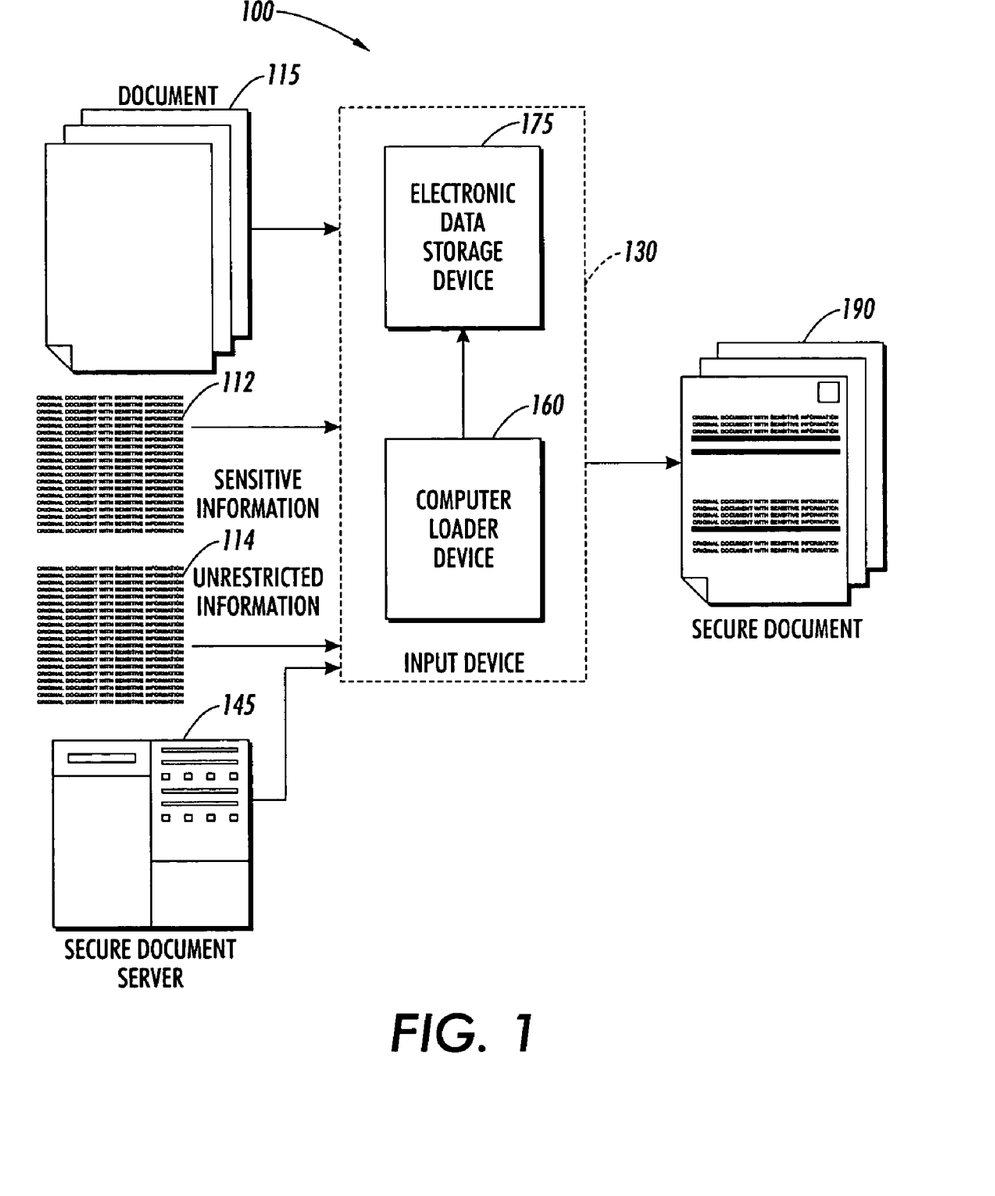
FIG. 1 is a schematic diagram showing the main components of a system for creating a secure document.

With reference to FIG. 1, a system 100 for creating a secure document 190 includes a number of components which will be described in detail. An input device 130 receives and creates an electronic version of information 112 to which access to should be restricted (also referred to as sensitive information). A document 115 may contain both information 112 to which access is restricted and information 114 to which access is not restricted. Alternately, the information 112 may come from another source, such as a separate document that exists in the memory of the input device 130 or a separate document that has been translated using the input device 130. Those skilled in the art will recognize that the information 112 can come from various sources and be within the scope and spirit of the presently disclosed embodiments.

The document 115 may be a hardcopy, an electronic document file, one or a plurality of electronic images, electronic data from a printing operation, a file attached to an electronic communication or data from other forms of electronic communication. The input device 130 may include one or more of the following devices: a copier, a xerographic system, an electrostatographic machine, a digital image scanner (e.g., a flat bed scanner or a facsimile device), a disk reader having a digital representation of a document on removable media (CD, floppy disk, rigid disk, tape, or other storage medium) therein, a hard disk or other digital storage media having one or more document images recorded thereon, a network or other communication capability for receiving a document and/or related information, or a multi-functional device (MFD). The MFD may be an apparatus comprising a facsimile function, a printer function, a copy function, a scanner function, a phone answering function, or other similar functions. Alternately, a plurality of devices, including at least one of the above functions, may be operatively interconnected by cable or by radio waves to constitute a MFD. In an embodiment, the input device 130 is a MFD. Those skilled in the art will recognize that the system 100 could include any device suitable for printing or storing a digitized representation of a document.

The document 115 undergoes a selection and assignment phase in which the information 112 is selected and associated user authorization restrictions (rules) are chosen for accessing the information 112. In an embodiment, the document 115 is an electronic document, for example, in XML format, and a software program standard is used to manually identify the information 112. For example, Sun's XACML (eXtensible Access Control Markup Language) is an OASIS standard that describes both a policy language and an access control decision request/response language. In an embodiment, the document 115 is a hardcopy document and a manual technique such as color marking or linguistic detection of elements is used to identify the information 112. These techniques will be discussed below.

The information 112 to which access to is restricted, and the information 114 to which access to is not restricted, in the document 115 may include, but is not limited to, text, data, and images. Those skilled in the art will recognize that any information within a document that can be stored in an electronic data storage device can be selected as sensitive. The user authorization restrictions which define the rules for accessing the information 112 may include, but is not limited to, a suite of protocols, key ciphers, and user-prescribed actions. For example, the rules may define which employees of a company should be given access to the information 112, what the information 112 is, or at what time, date and/or location the information 112 may be viewed. The access rules may also contain position references which define the position of the information 112 within the document 115, and optionally, decryption rules for the information 112 (if the information 112 is encrypted before storing in the electronic data storage device).

After the selection and assignment phase, a data structure is prepared by a secure document server 145. The secure document server 145 may be part of the input device 130 or alternatively may be a separate component. If the document 115 contains information 114 to which all users have access to, the secure document server 145 prepares the unrestricted information 114 for rendering. The secure document server 145 also prepares a data structure for rendering which includes the contents, access rules, and position of the information 112.

The secure document server 145 then sends the unrestricted information 114 and the data structure to a computing loader device 160. As show in FIG. 1, the computing loader device 160 is integrated in the input device 130. Alternately the computing loader device 160 may be a freestanding or dedicated device. The computing loader device 160 is capable of storing the data structure in the memory of an electronic data storage device 175.

After the contents of the data structure are stored in the electronic data storage device 175, the secure document 190 is created. The secure document 190 contains visible unrestricted portions (visible unrestricted information 114 from document 115), hidden restricted portions (which are areas in the document where the information 112 resides) and the electronic data storage device 175. The secure document 190 may be printed to form a hardcopy either using the input device 130 or using a copier that is in operative communication with the input device 130.

Figure 2:
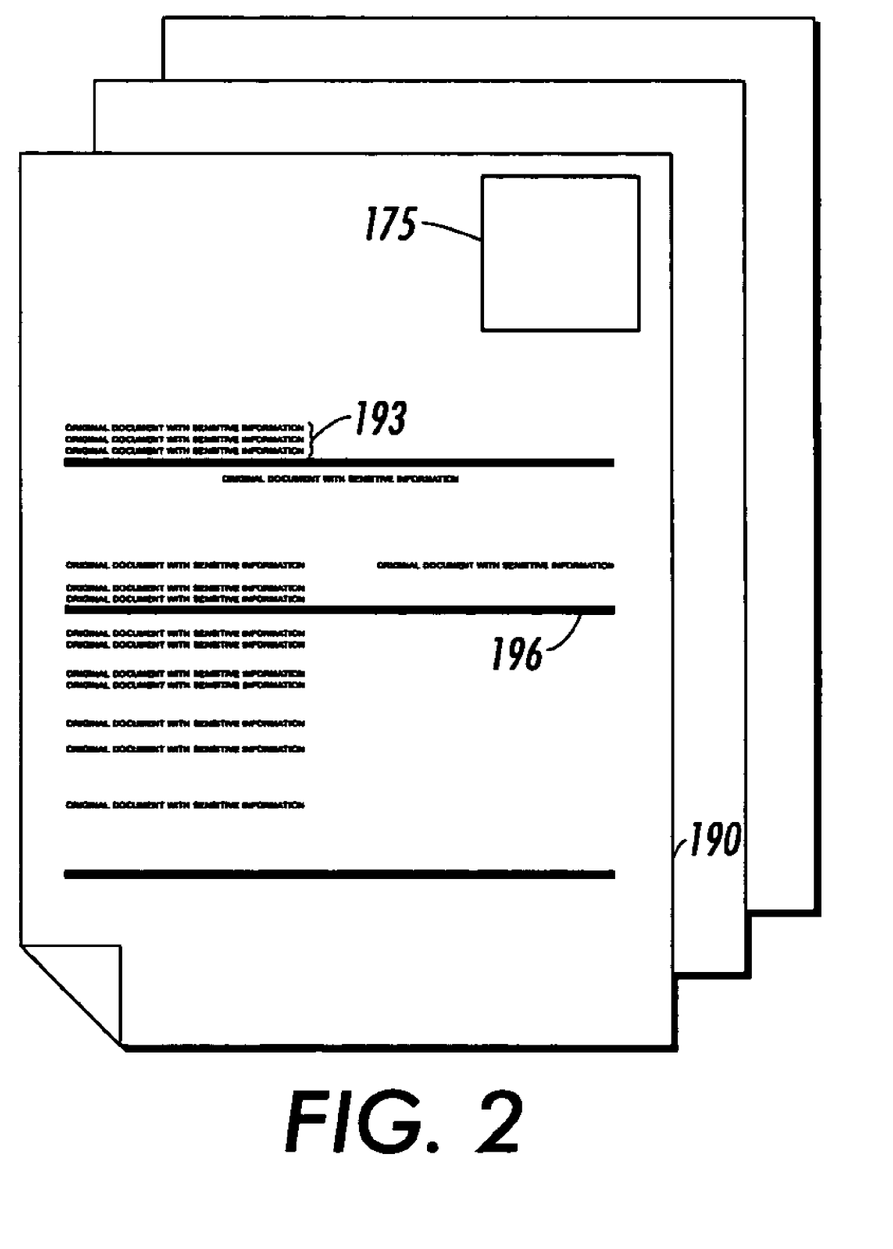
FIG. 2 is an exemplary illustration of a secure document created using the system.

FIG. 2 is an exploded view of the secure document 190 created using the system shown in FIG. 1. The secure document 190 includes visible unrestricted portions shown generally at 193, hidden restricted portions shown generally at 196, and the electronic data storage device 175 operatively connected to the secure document 190. The hidden restricted portions shown generally at 196 in FIG. 2 are hidden by a blacked-out technique, which alerts a user to the fact that information has been hidden. Other techniques of hiding portions are possible and within the spirit and scope of the presently disclosed embodiments, including, but not limited to linguistic depersonification, where a proper name is replaced with a neutral expression, such as "the first person", or value replacement, where names and figures are replaced with randomly chosen names and figures. Those skilled in the art will recognize that the electronic data storage device 175 can be placed at any location within the secure document 190 and be within the scope and spirit of the invention. For example, the electronic data storage device 175 can be placed in the upper right-hand corner of the secure document 190 (as shown in FIG. 2), in any other corner of the secure document 190, in the margins of the secure document 190, on the backside of the secure document 190, or embedded into the writing surface on which the secure document 190 is printed.

Figure 3:
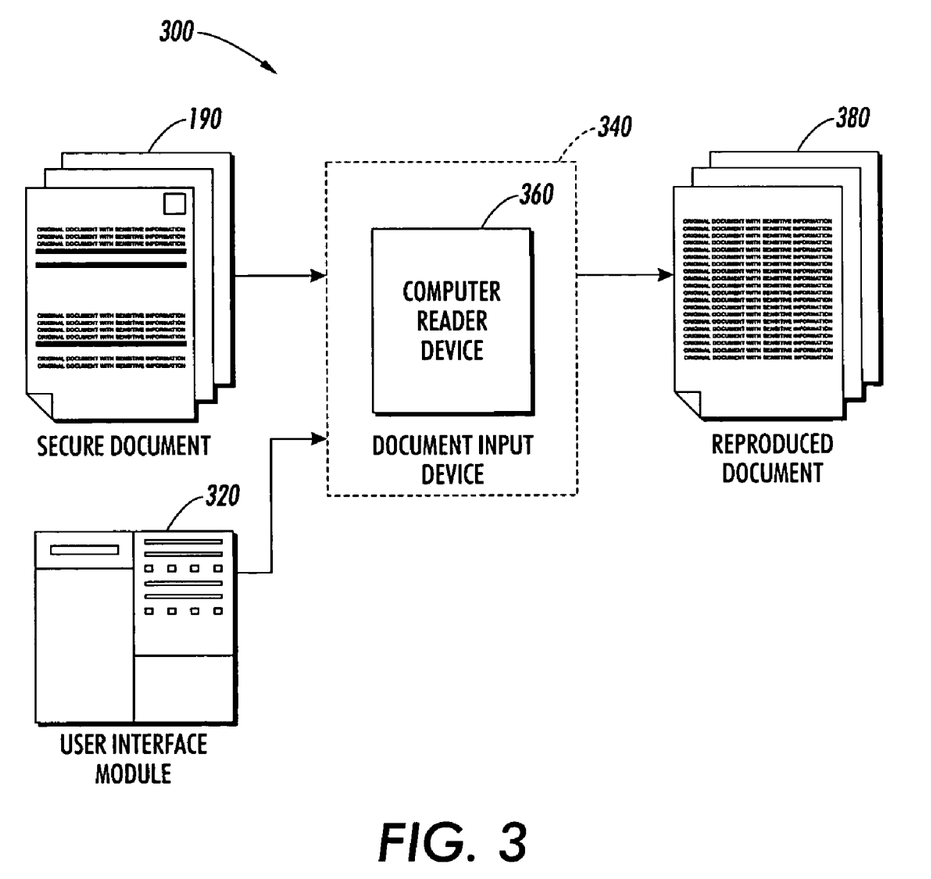
FIG. 3 is a schematic diagram showing the main components of a system for reproducing a secure document.

As shown in FIG. 3, a system 300 for reproducing the secure document 190 of FIG. 1 includes a document input device 340 which receives and digitizes the secure document 190. The document input device 340 may include one or more of the following devices: a copier, a xerographic system, an electrostatographic machine, a digital image scanner (e.g., a flat bed scanner or a facsimile device), a disk reader having a digital representation of a document on removable media (CD, floppy disk, rigid disk, tape, or other storage medium) therein, a hard disk or other digital storage media having one or more document images recorded thereon, a network or other communication capability for receiving a document and/or related information, or a multi-functional device (MFD). The MFD may be an apparatus comprising a facsimile function, a printer function, a copy function, a scanner function and an answering phone function. Alternately, a plurality of devices, each including at least one of the above functions, may be interconnected to constitute a MFD. In an embodiment the document input device 340 is a MFD. Those skilled in the art will recognize that the system 300 would work with any device suitable for printing or storing a digitized representation of a document.

A user interface module 320 gathers information from a user wishing to gain access to the hidden restricted portions 196 of the secure document 190. The user interface module 320 may be provided outside the document input device 340 or as part of the document input device 340. The user interface module 320 may include any feature that will allow the user to identify and authenticate himself including, but not limited to name, password, pin, X 509 certificate, access card, group belongings, time, date, location, decryption key, biometric technology or other identifiers. The user interface module 320 may comprise any personal identification system known to those skilled in the security arts.

A computing reader device 360 is able to read the data structure in the memory of the electronic data storage device 175. The access rules are accessed and compared with the information gathered from the user interface module 320 and a determination is made to either allow or not allow access to the sensitive information 112.

After a determination is made as to whether to allow or disallow the sensitive information 112 to be viewed in each case, the hidden restricted portions 196 are replaced with the appropriate sensitive information 112 and inserted at the correct position in a new document 380. The document 380 may be printed to form a hardcopy either using the input device 340 or using a copier that is in operative communication with the input device 340. The reproduced document 380 will contain the visible unrestricted portions 193 from the document 190, the visible sensitive information 112 that the user is allowed access to, the hidden restricted portions 196 that the user is not allowed access to and the electronic data storage device 175.

Figure 4:
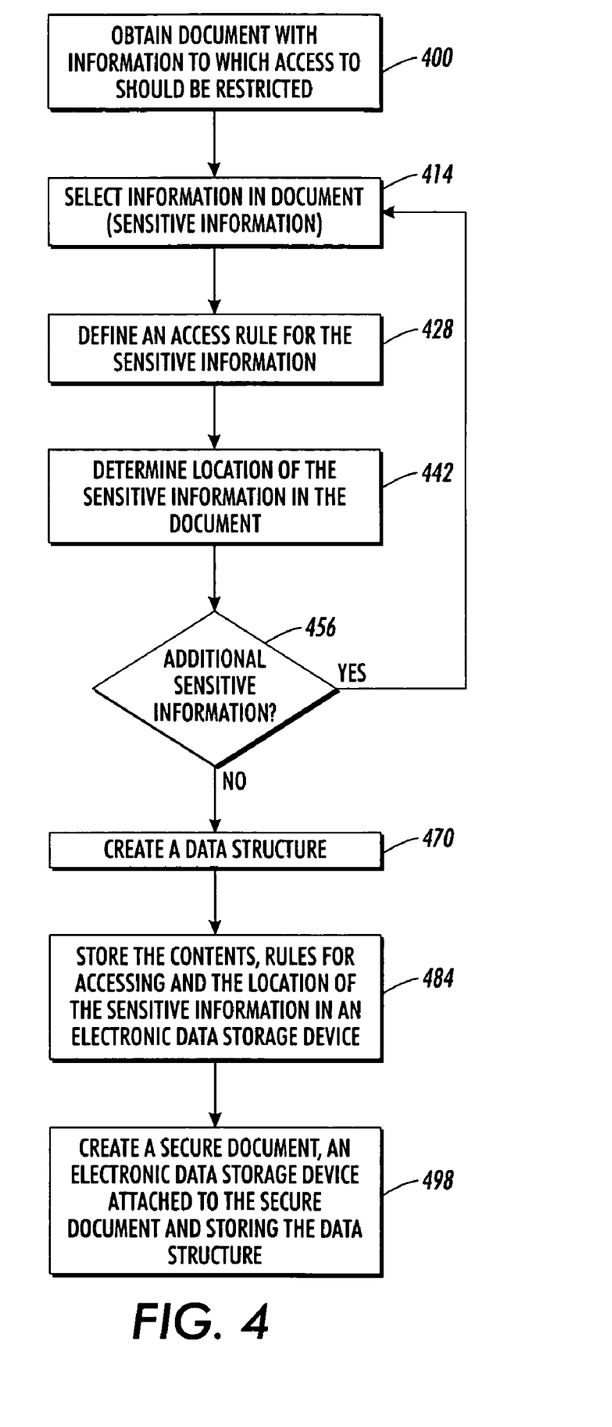
FIG. 4 is a flow diagram for the method of creating a secure document.

FIG. 4 is a flow diagram illustrating the steps of a method for creating a secure document 190 with visible unrestricted portions 193, hidden restricted portions 196, and the electronic data storage device 175. In step 400, an individual obtains a document 115 that contains information that the individual may want to hide or restrict access to (sensitive information 112). In step 414, an individual (for example, a manager of a company) chooses which information 112, or portions of information 112 in the document 115, is considered sensitive. The individual may want to hide or restrict the information 112 from certain users of the document 115. The decision to hide may be based on a company wanting to keep certain information 112 confidential to users having access to the document 115. Other reasons may include, but are not limited to, information in which a company may not wish to divulge until a later date or time. Those skilled in the art will recognize that information within a document 115 may be selected for redaction based on a user's needs and be within the scope and spirit of the present invention.

In step 428, the individual defines user authorization restrictions (i.e., an access rule, or a set of rules) for the sensitive information 112. Different degrees of sophistication are possible when expressing the rules, including the use of predefined groups and access control lists.

In step 442, the position of the sensitive information 112 within the document 115 is stored. The position references are stored in order for the sensitive information 112 to be made visible in the correct position of the secure document 190 that is created once a user is given access to the sensitive information 112.

In steps 414, 428 and 442, numerous embodiments exist for identifying the sensitive information 112 of the document 115 subject to the access rules. In an embodiment, the information 112 to which access to be restricted is identified using a policy language and an access control decision request/response language, such as, for example the XACML standard. An individual inputs a document 115 into the document input device 130 for digitization. Typically, the document input device 130 generally includes an input scanner (for example, as part of a MFD) for electronically capturing the general appearance (i.e., the human readable information content and the basic graphical layout) of human readable hardcopy documents; programmed computers, enabled with a XACML software engine, for enabling a user to create, edit and otherwise manipulate electronic documents; and printers (for example, as part of a multi-functional device) for producing hardcopy renderings of electronic documents. Those skilled in the art will realize that other standards for security, including, but not limited to, XML Cryptographic Messaging Syntax (XCMS), Security Assertion Markup Language (SAML), Service Provisioning Markup Language (SPML), Web Services (WS) Security, the XML Common Biometric Format (XCBF) and similar languages and formats are within the scope and spirit of the presently disclosed embodiments.

Figure 6:
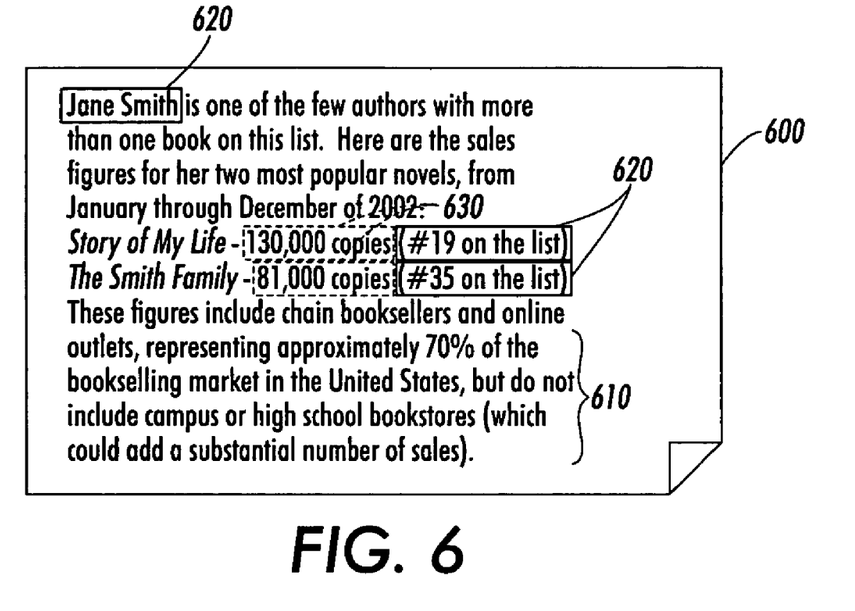
FIG. 6 is an example of a technique for selecting the information which access to be restricted in a document.
Figure 7:
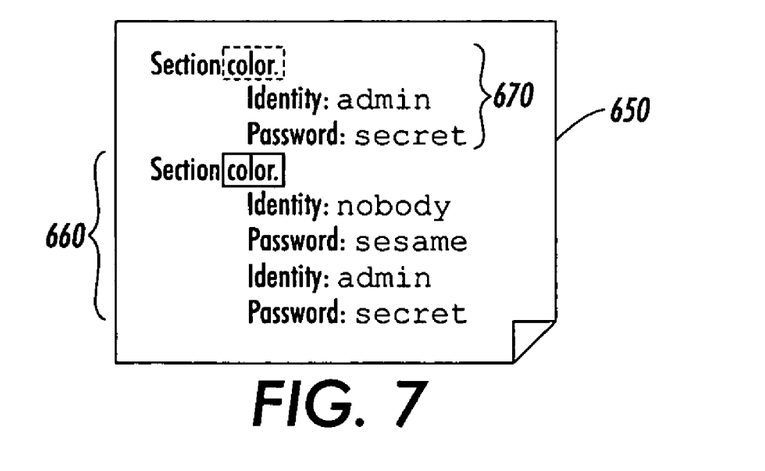
FIG. 7 is an example of a control sheet that defines the user authorization restrictions associated with the information of the document of FIG. 6.

In an embodiment, the information 112 to which access to be restricted is identified using a color marking technique, as shown in FIGS. 6 and 7. In color marking, the individual highlights in different colors to identify sensitive information 112 of the document 115, which is printed on paper, as shown in FIG. 6. Highlights to the document can be made using conventional methods of highlighting including highlighter pens or markers, highlighting tape, electronic highlighting, and similar means of highlighting portions of a document. An identified portion thus consists of all the (possibly non-contiguous) sections that are highlighted in the same color. After highlighting the document 115, an individual inputs the document 115 into the input device 130 for digitization. Typically, the input device 130 generally includes an input color scanner (for example, as part of a MFD) for electronically capturing the general appearance (i.e., the human readable information content and the basic graphical layout) of human readable hardcopy documents; programmed computers for enabling a user to create, edit and otherwise manipulate electronic documents; and printers (for example, as part of a MFD) for producing hardcopy renderings of electronic documents. The scanning process may be controlled from the scanning device; either by letting the individual enter commands on the scanner's control panel, or by using a "control sheet" 650, as shown in FIG. 7. The control sheet 650 may contain access rules that associate each color with one or more user identities and/or passwords. Different conventions may be used to simplify the highlighting. For example, highlighting a section heading may mean that the entire section should be considered highlighted; vertical highlights in the margin may be used to highlight consecutive lines of text, and highlight "boxes" may surround document parts containing both text and figures, drawings, tables and other information.

In an embodiment, the sensitive information 112 of the document 115 are identified using a linguistic marking technique. An example of such a linguistic marking technique relies on regular expression grammars to express the typical patterns of linguistic entities such as proper names (available as FactFinder from Xerox PARC). More advanced techniques may rely on natural language parsing grammars to find other more subtle patters that for example describe linguistic entities in relation to each other (e.g., events that appear at a given location or in a certain order) (available as GoldMiner technology developed at XRCE). Instead of using a pen to highlight all the parts that should be associated with an access level, the individual specifies the types of terms for which access restrictions should apply, for example, person names, protein names, dates, amounts. If the document 115 is a paper document, the process relies on optical character recognition (OCR) and control sheets where term types can be selected, for example from a pre-defined list, and associated with access control rules in a similar way to color highlighting.

As shown in FIG. 4 at step 456, steps 414, 428 and 442 are repeated until all of the sensitive information 112 has been identified. Each of the sensitive information 112 may have different access rights. For example, the access rules may allow some of the sensitive information 112 to be accessed by a particular user while other sensitive information 112 may not be accessed by that same user.

In step 470, a data structure is prepared using the secure document server 145. In the case of a MFD, this secure document server 145 may be physically part of the MFD or a separate entity. If the document 115 contains unrestricted information 114 (information that all users are allowed access to), the secure document server 145 prepares the unrestricted information 114 for rendering. The secure document server 145 also prepares a data structure which consists of the contents, access rules, and position of the sensitive information 112.

In step 484, the contents, access rules, and position of the sensitive information 112 are stored in the electronic data storage device 175. The sensitive information 112 is stored in the electronic data storage device 175 using the computing loader device 160 capable of placing electronic information in a memory device of the electronic data storage device 175. The computing loader device 160 may be, for example, integrated into a machine such as a computer, or the input device 130. "Computer" as used herein includes, but is not limited to, personal computers (PCs) having an operating system; graphical workstations having any known and available operating system; personal digital assistants (PDA), cellular telephones having computer capabilities, a telephone having computer capabilities and Web televisions, or any other device including an inherent or connectable display device.

The embodiments described herein for creating a secure document relies on a printer equipped with the necessary hardware and software to write data into an electronic data storage device. The printer may be part of a MFD or a separate device operatively connected to a MFD. For reasons of cost, only document front sheets may be equipped with an electronic data storage device, in which case the printer will either need to be able to pick the front sheets from a separate paper feeder where electronic data storage device-equipped sheets are stored, or to append electronic data storage devices as sticky labels to the front sheets.

In step 498, the secure document 190 is created which contains visible unrestricted portions 193, hidden restricted portions 196, and the electronic data storage device 175. In an embodiment, the secure document 190 may be a hardcopy output document that is printed. Alternately, in step 498, the secure document 190 is saved as an electronic document for viewing or reproduction. The secure document 190 can be saved as an image file format such as a PDF, TIFF, or similar file formats. The secure document 190 may be a hardcopy, an electronic document file, one or a plurality of electronic images, electronic data for a printing operation, a file attached to an electronic communication or data for other forms of electronic communication. The method terminates at step 498.

Figure 5:
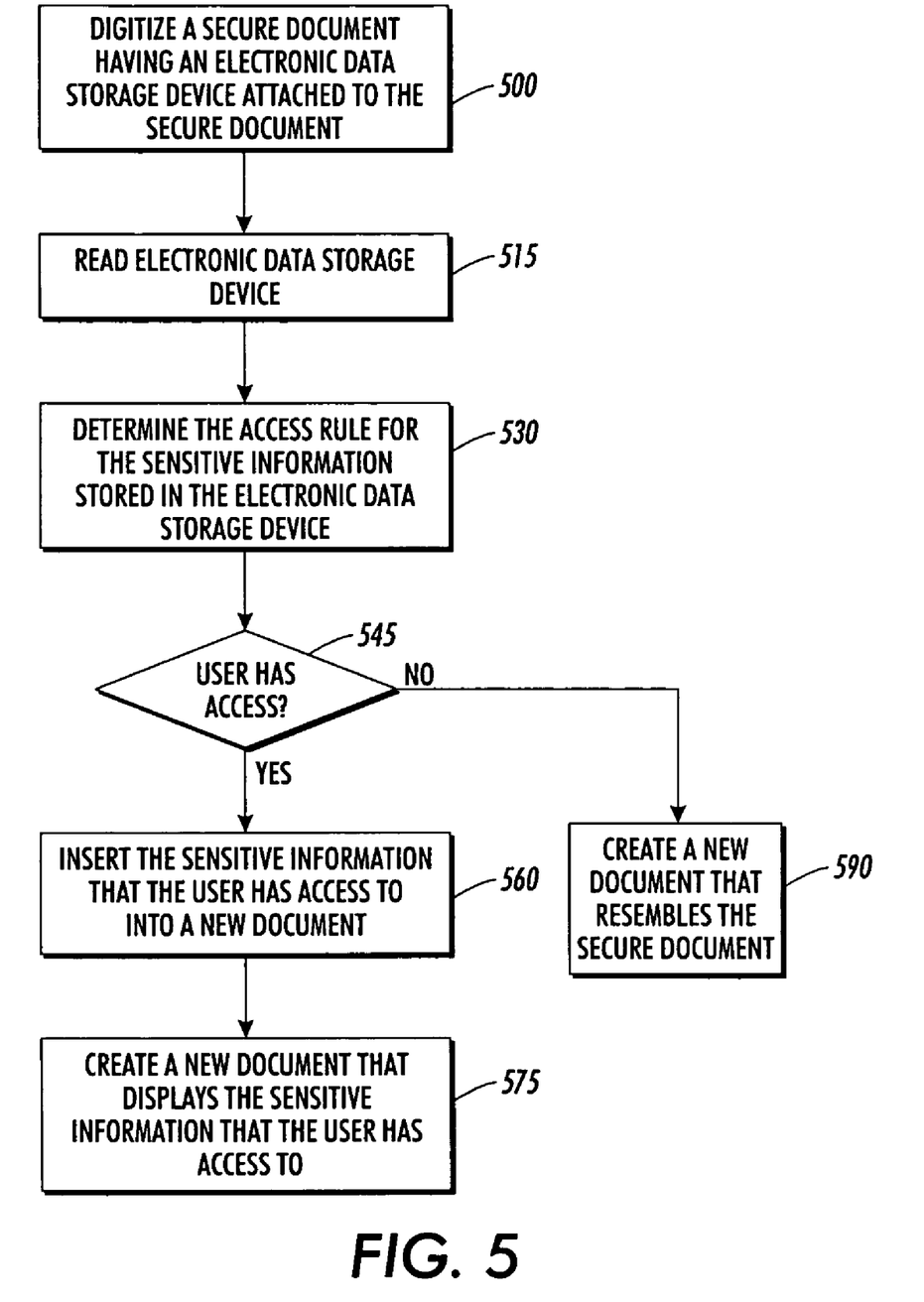
FIG. 5 is a flow diagram for the method of reproducing a secure document.

FIG. 5 is a flow diagram illustrating the steps of a method for reproducing the secure document 190 having the electronic data storage device 175 attached to the secure document 190. In step 500, a user obtains a copy of the secure document 190 containing sensitive information 112 that has been stored in the electronic data storage device 175 and represented in the secure document 190 as hidden restricted portions 196. The user may want to gain access to the hidden restricted portions 196 and subsequently view and/or print the new document 380 revealing the hidden restricted portions 196 that the user has access to. Typically, the user will electronically capture the document 190 using the document input device 340 including, but not limited to, a digital copier, a printer, a digital image scanner, a multi-functional device, a disk reader having a digital representation of a document on removable media therein, or a hard disk or other digital storage media having one or more document images recorded thereon.

Once the secure document 190 has been represented in a digitized form, the computing reader device 360 is employed to read the contents of the electronic data storage device 175, as shown in step 515. The computing reader device 360 is able to extract the user authorization restrictions (rules for accessing the hidden restricted portions 196), the position references of the hidden restricted portions 196, and the contents of the restricted portions 196. Once the access rules have been established, as shown in step 530, the user interface module 320 receives the identity of a user attempting to gain access to the secure document 190. Once the user identity has been established, the user interface module 320 then provides the document input device 340 with this information. The document input device 340 compares the user identity with the access rules and determines whether the user has access to the hidden restricted portions 196, as shown in step 545. If the user is allowed access to the restricted portions 196, the method continues to step 560 and the sensitive information that the user has access to is inserted into a new document 380. If the restricted portions 196 is encrypted, the encrypted content of the restricted portions 196 will be decrypted. If the user is not allowed access to the restricted portions 196, the method continues to step 590 and the new document 380 created resembles the original secure document 190, where all restricted portions 196 are still hidden.

After the restricted portions 196 that the user is allowed access to have been defined, a document is created 380 that displays the sensitive information that the user has access to, as shown in step 575.

FIGS. 6 and 7 show an example of a document 600 and associated control sheet 650 which defines the sensitive information, 620 and 630, and access rules, 660 and 670, for the sensitive information, 620 and 630, respectively, using the color marking technique described above. FIG. 6 shows the document 600 that contains both unrestricted information, shown generally at 610, (information to which all users of the document are allowed access to) and sensitive (or restricted) information, 620 and 630, to which only certain users of the document should have access to. The sensitive information 620 has been highlighted with a green highlighter and the sensitive information 630 has been highlighted with a yellow marker. FIG. 7 shows the control sheet 650 which define the access rules 660 and 670 for the sensitive information 620 and 630, respectively. For example, the user identity "nobody" has an associated password "sesame" which will allow "nobody" to access sensitive information 620. The user identity "admin" has an associated password "secret" which will allow "admin" to access the sensitive information 620 and 630.

A method for creating a secure document includes selecting information in a document to which access is to be restricted; defining rules for accessing the information; producing a data structure; storing the data structure in an electronic data storage device; and creating a secure document.

A method for accessing information stored in an electronic data storage device of a secure document includes detecting an electronic data storage device of a secure document; reading the electronic data storage device of the secure document; determining rules for accessing the information stored in the electronic data storage device of the secure document; obtaining a user identity from a user; comparing the rules for accessing the information with the user identity obtained; and determining which of the information stored in the electronic data storage device the user is allowed access to.

A secure document includes an electronic data storage device that stores information to which access is to be restricted and rules for accessing the information.

The system for reproducing secure documents can be used for controlling access to information in a secure document for multiple users. The system can control distribution of a secure document to the entire staff of a company. For example, a secure document containing information regarding the salaries of employees at the company would function with the system for reproducing secure documents. The secure document contains visible unrestricted portions (information that all users have access to), for example the names of the employees, hidden restricted portions (information that has been stored on an electronic data storage device attached to the secure document), for example the social security numbers and salaries of the employees, and an electronic data storage device having the contents of the restricted portions of the secure document.

The head of the company will identify herself by entering her password in a user interface module, for example, a keyboard, that is in communication with the system for reproducing secure documents. The head of the company has a password that allows access to all of the sensitive information stored in the electronic data storage device of the secure document. Therefore, the system will allow all of the hidden restricted portions within the secure document to be made visible. The document reproduced will display the names, social security numbers and salaries of all of the employees in the company.

An executive at the same company will identify herself by entering her password in the user interface module associated with the same or another system for reproducing secure documents in the company. The executive has a password that will give her access to all of the sensitive information stored in the electronic data storage device of the secure document for all the employees that the executive is responsible for at the company. Therefore, the hidden restricted portions that will be made visible will be those associated with all employees that the executive is responsible for. The document reproduced will display the names, social security numbers and salaries only for the employees that the executive is responsible for in the company. All the sensitive information that the executive is not allowed access to will be hidden in the document reproduced.

The first year employee at the same company will identify himself by entering his password in the user interface module associated with the same or another system for reproducing secure documents in the company. The first year employee has a password that only provides access to the sensitive information stored in the electronic data storage device of the secure document associated with his salary. Therefore, the document reproduced will only display the first year employee's salary. All the sensitive information that the first year employee is not allowed access to will be hidden in the document reproduced.

A clerk working at the same company gets a copy of the document and enters his password in the user interface module associated with the same or another system for reproducing secure documents in the company. The clerk has a password that gives the clerk access to none of the sensitive information in the secure document. Therefore, the document reproduced will be an exact duplicate of the secure document, with none of the hidden restricted portions made visible.

A third party who gets a copy of the secure document and attempts to reproduce the secure document without a password having an authorization level will receive a document that is an exact duplicate of the secure document, with none of the hidden restricted portions made visible.

The system for reproducing secure documents can be used for controlling distribution of a secure document containing time and/or date sensitive information. The system for reproducing secure documents has application for any number of confidential time sensitive documents, including, but not limited, product releases, corporate governance documents, filings with governmental agencies, and press releases. The system allows secure distribution of a document prior to being made public permitting true synchronized disclosure when the information becomes visible when copied after the designated time. Alternatively, a decoding key is distributed after a designated time to the individuals that are allowed access to the restricted portions in the secure document. For example, a company plans on publicly announcing, through a hardcopy document, their fourth quarter earnings statement on Wednesday at 9:30 a.m. A secure document containing the date sensitive and time sensitive information, which is hidden in an electronic data storage device, is distributed to the company, as well as the public. The electronic data storage device contains the contents and user authorization restrictions (access rules) for the date sensitive and time sensitive information. The access rules define the date and time that the sensitive information can be made visible. For example, the date sensitive and time sensitive information cannot be made visible until after Wednesday at 9:30 a.m.

Before the sensitive information is to be made visible according to the access rules, on Tuesday for example, an employee of the company obtains a hardcopy of the secure document. The employee decides that she wants to get the fourth quarter earnings statement before everyone else. The secure document is taken to a company system for reproducing secure documents, and the employee enters her access card into the card holder. The access rules are read from the electronic data storage device associated with the secure document. The access rules state that access to the sensitive information is not allowed prior to Wednesday at 9:30 a.m. A document is reproduced on the system that is an exact duplicate of the secure document, with none of the sensitive information visible.

When the same employee tries to reproduce the secure document after Wednesday at 9:30 a.m., the document is reproduced with the sensitive information made visible.

The document reproducing system can be used for providing secure identification documents which would not be readable, alterable or forgeable by the carrier. The document reproducing system has application for many types of documents, including, but not limited to, identification documents, government documents, travel documents, and tickets to events. For example, passports, visas and border crossing cards having restricted portions hidden in an electronic data storage device are more difficult to counterfeit or alter, allow faster but more thorough inspection of each carrier, and permit instantaneous capture of data from each document. The document reproducing system and methods could be used to create travel documents and identification cards that would provide better security and reduce alterations, forgeries, and other illicit activities by avoiding reproduction or viewing of restricted portions such as social security numbers, without proper authority and equipment. The authority to view sensitive or restricted portions within an identification document can be restricted to parties requiring access to the sensitive information while maintaining the suitability of the document for its intended purposes.

Birth, marriage and death documents, which are often treated as public records, would be much more secure if they contained an electronic data storage device that stores access to restricted portions. Therefore, the disclosed methods could be used to provide a sense of security to these otherwise public documents.

The document reproducing system can be used as a rights management system for hardcopy documents. Such a rights management system for hardcopy documents would be similar to digital rights management for electronic content. Content protection is of the utmost concern for content owners and distributors, especially with peer-to-peer file sharing and piracy over the internet. Digital rights management technology allows digital content to be distributed securely on CD-ROMs, DVD-ROMs, peer-to-peer networks, enterprise networks and the internet. Digital rights management allows a vendor of content in electronic form to control the material and restrict its usage in various ways that can be specified by the vendor. Typically the content is a copyrighted digital work to which the vendor holds rights. Many digital rights management systems fail to meet the challenge of protecting the rights of the copyright owner while also respecting the rights of the purchaser of a copy. Digital rights management systems have not succeeded in preventing criminal copyright infringement by organized, unlicensed, commercial pirates. Flaws of some digital rights management systems include, but are not limited to, (i) physical protection, they utilize separate hardware to ensure protection (dongles and USB and smart card devices), (ii) product activation, invalidates or severely restricts a product's functionality until the product is registered with a publisher by means of a special identification code, and (iii) watermarking, adds hidden copyright or other verification messages to the content but does not restrict its use, and provides a mechanism to track the content to the original owner.

The document reproducing system and methods disclosed create a hardcopy document that hides copyright information and an electronic data storage device that defines the access rules, for example, who has access to the copyright information. The advantages of using the document reproducing system and methods include, but are not limited to, the copyright information and the access rules are present on the same hardcopy document; access to the copyright information is immediate, after the user identifies himself; and the hardcopy document contains user restrictions.

The claims can encompass embodiments in hardware, software, or a combination thereof.

The words "printing", "printed" or "printer" as used herein encompass any apparatus, such as a digital copier, bookmaking machine, facsimile machine, multi-function machine, etc. which performs a print outputting function for any purpose.

Although a monochrome printing apparatus has been described herein, the claims can encompass embodiments that print in color or handle color image data.

All patents, patent applications, and published references cited herein are hereby incorporated by reference in their entirety. It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A system for creating multiple printed versions of a document comprising:
    an image producing system for printing a first printed version of an electronically tagged secure document with an unrestricted group of visibly unrestricted portions visible to a first user and a restricted group of visibly restricted portions hidden from the first user based on rules for user access; and
    a first portable data storage device with a transceiver physically attached to the first printed version of the electronically tagged document, wherein the first portable data storage device includes a data structure to store data contents of visibly restricted portions of the document, rules for user access to the visibly restricted portions of the document, and at least one location within the document of the visibly restricted portions;
    whereby, in response to a second user receiving authorization to access the visibly restricted portions, the image producing system reading the data structure from the first portable data storage device via the transceiver physically attached to the first printed version of the electronically tagged document, and the image producing system printing a second printed version of an electronically tagged secure document with the data contents of the visibly restricted portions inserted and made visible at the location specified in the data structure.

2. The system of claim 1, further comprising:
    an input device for scanning a printed document to create an electronic version of the printed document containing a plurality of portions of visually perceptible data to be categorized, based on a combination of i) markings in the printed document and ii) user authorization restrictions, as any one of visibly restricted portions and visible unrestricted portions; and
    a computing loader for storing the data structure onto the first portable data storage device wherein the markings are color highlights on the printed document.

3. The system of claim 2 wherein the color highlights on the printed document include a separate color for each user authorization restrictions that define rules for accessing the data content.

4. The system of claim 1, wherein the first portable data storage device with the transceiver physically attached to the first printed version of the electronically tagged secure document is a radio frequency identification tag and wherein the second version of the document includes a second portable data storage device to store the data structure with a transceiver physically attached thereto.

5. The system of claim 1, wherein the document contains blacked-out areas representing one or more positions where the data content would reside.

6. The system of claim 3 wherein the separate color in the color highlights on the printed document defines rules for accessing the contents for all non-contiguous portions of visually perceptible data to be categorized as visibly restricted portions.

7. The system of claim 6 wherein the separate color in the color highlights on the printed document are formed in a margin of the printed document.

8. The system of claim 1, further comprising:
    a user interface for receiving a request from the second user to reproduce the first printed version of the electronically tagged secure document with at least a portion of the visibly restricted portions which have been stored in the first portable data device;
    a computing reading device that reads the first portable data storage device physically attached to the first printed version of the electronically tagged document; a secure document server determines the rules for accessing the visibly restricted portions along with a user's identity; and
    wherein the image producing system inserts, from the first portable data storage device, the contents of those visibly restricted portions which have been authorized, in response to the user's identity allowing access thereto, whereby the location of the contents to be inserted into the second printed version of the electronically tagged secure document is read from the first portable data device.

9. A system for printing a different version of a document comprising:
    an input device for scanning a printed document to create an electronic version of the printed document containing a plurality of portions of visually perceptible data to be categorized, based on a combination of i) markings in the printed document and ii) user authorization restrictions, as any one of visibly restricted portions and visible unrestricted portions;
    a computing loader for storing the data structure onto the first portable data storage device;

a computing reading device for reading a data structure from a first portable data storage device via a transceiver physically attached to a first printed version of an electronically tagged secure document, wherein the computing device, determines from the data structure, a restricted group of visibly restricted portions of information to which access is to be restricted, and the data structure includes contents of visibly restricted portions, rules for accessing the visibly restricted portions, and locations within the first printed version of the electronically tagged secure document of the visibly restricted portions;

a user interface module for receiving a user's identity; and an image producing system for printing a second printed version of a document and inserting, from the first portable data storage device, the contents of those visibly restricted portions which have been authorized, in response to the user's identity allowing access thereto, whereby the locations of the contents to be inserted into the second printed version of the secure printed document being printed is read from the first portable data device.

10. The system of claim 9, wherein the data structure comprises information to which access is to be restricted and user authorization restrictions for the information and wherein the markings are color highlights on the printed document, and wherein the second printed version of the electronically tagged secure document includes a second portable data storage device to store the data structure with a transceiver physically attached thereto.

11. The system of claim 9, further comprising:

an input device for scanning a printed document to create an electronic version of the printed document containing a plurality of portions of visually perceptible data to be categorized, based on a combination of i) markings in the printed document and ii) user authorization restrictions, as any one of visibly restricted portions and visible unrestricted portions; and a computing loader for storing the data structure onto the first portable data storage device wherein the markings are color highlights on the printed document.

12. The system of claim 11 wherein the color highlights on the printed document include a separate color for each user authorization restrictions define rules for accessing the information stored in the electronic data storage device 13. The system of claim 12 wherein the rules for accessing the information defines a user identity.

14. The system of claim 13 wherein the user identity is a password.

15. The system of claim 9 wherein the image producing system comprises an electrostatographic machine.

16. A computer-implemented method for creating multiple versions of a document comprising:

reading from an input device an image scan of a printed document to create an electronic version of the printed document containing a plurality of portions of visually perceptible data to be categorized, based on a combination of i) markings in the printed document and ii) user authorization restrictions, as any one of visibly restricted portions and visible unrestricted portions;

selecting information in a document to which access to be restricted;

defining rules for accessing the information;

producing a data structure that includes contents of the visibly restricted portions, rules for accessing the visibly restricted portions, and locations within the printed document of the visibly restricted portions;

storing the data structure in a portable data storage device with a transceiver; and creating, with an image producing system, a first version of a printed document with the restricted group of visibly restricted portions hidden from a first user based on the user authorization in the data structure, the portable data storage device attached to the printed document, whereby in response to a second user receiving authorization to access to the visibly restricted portions, the image producing system reads the data structure from the portable data storage device via the transceiver physically attached to the first printed version of the electronically tagged document, and the image producing system prints the contents of the visibly restricted portions which have been authorized at the locations specified in the portable data device, into a second printed version of a printed document, whereby in response to a second user receiving authorization to access the visibly restricted portions, the image producing system reads the data structure from the portable data storage device via the transceiver physically attached to the first printed version of the electronically tagged document, and the image producing system prints a second printed version of an electronically tagged secure document with the data contents of the visibly restricted portions inserted and made visible at the location specified in the data structure.

17. The method of claim 16 wherein the document includes information to which access is to be restricted and information to which access is not to be restricted and wherein the markings are color highlights on the printed document, and wherein the second printed version of the electronically tagged secure document includes a second portable data storage device to store the data structure with a transceiver physically attached thereto.

18. The method of claim 17 wherein the information in the document to which access is to be restricted is selected using a color marking technique.

19. The method of claim 16 wherein the rules for accessing the information to which access is to be restricted defines a user identity.

20. The method of claim 17, wherein the color highlights on the printed document include a separate color for each user authorization restrictions that define rules in the data structure.

21. The method of claim 18 wherein the separate color in the color highlights on the printed document defines rules for accessing the information for all non-contiguous portions of visually perceptible data to be categorized as visibly restricted portions.

22. A computer-implemented method for creating multiple versions of a document comprising:

detecting an electronic data storage device physically coupled to a first version of the secure printed document;

reading the electronic data storage device of the first version of the secure printed document and the data structure includes contents of visibly restricted portions, rules for accessing the visibly restricted portions, and locations within the first version of secure document of the visibly restricted portions;

determining rules for accessing the contents stored in the electronic data storage device of the secure printed document;

obtaining a user's identity;

comparing the rules for accessing the information with the user identity;

determining which of the information stored in the electronic data storage device to allow access to; and creating, in response to the user's identity allowing access thereto, a second version of a secure document with contents of those visibly restricted portions which have been authorized inserted thereinto, whereby the contents and the location of the contents to be inserted into the secure printed document is read from the electronic data device.

23. The method of claim 22 wherein the rules for accessing the information stored in the electronic data storage device define a user identity.

24. The method of claim 22 further comprising inserting the information that the user has access to into a new document and reproducing the document.

* * * * *

UNITED STATES PATENT AND TRADEMARK OFFICE
CERTIFICATE OF CORRECTION

| | | |
|---|---|---|
| PATENT NO. | : 7,770,220 B2 | Page 1 of 1 |
| APPLICATION NO. | : 11/204961 | |
| DATED | : August 3, 2010 | |
| INVENTOR(S) | : Christer E. Fernstrom | |

It is certified that error appears in the above-identified patent and that said Letters Patent is hereby corrected as shown below:

On the Title page, please insert Assignee information as follows:

-- Assignee: Xerox Corporation, Norwalk, Connecticut --

Signed and Sealed this

Thirteenth Day of December, 2011

David J. Kappos
*Director of the United States Patent and Trademark Office*